United States Patent [19]
Takahashi et al.

[11] Patent Number: 4,876,161
[45] Date of Patent: Oct. 24, 1989

[54] PHOSPHOR AND RADIATION IMAGE STORAGE PANEL

[75] Inventors: Kenji Takahashi; Takashi Nakamura; Yuichi Hosoi, all of Kaisei, Japan

[73] Assignee: Fuji Photo Film Co., Ltd., Kanagawa, Japan

[21] Appl. No.: 240,457

[22] Filed: Sep. 2, 1988

Related U.S. Application Data

[63] Continuation of Ser. No. 47,594, May 11, 1987, abandoned, which is a continuation of Ser. No. 727,972, Apr. 26, 1985, abandoned.

[30] Foreign Application Priority Data

Apr. 26, 1984 [JP] Japan .................................. 59-84358
Apr. 26, 1984 [JP] Japan .................................. 59-84359

[51] Int. Cl.$^4$ ............................................. C09K 11/61
[52] U.S. Cl. ............................. 428/691; 252/301.4 H; 252/301.4 F; 252/301.4 P
[58] Field of Search ................. 252/301.4 H, 301.4 F, 252/301.4 P; 428/691

[56] References Cited

U.S. PATENT DOCUMENTS 3,163,608 12/1964 Yocom ..................... 252/301.4 H X
3,447,097 5/1969 Kiss ......................... 252/301.4 H X

FOREIGN PATENT DOCUMENTS 19880 12/1980 European Pat. Off. ..... 252/301.4 H
29963 6/1981 European Pat. Off. ..... 252/301.4 H
2642226 3/1978 Fed. Rep. of Germany ... 252/301.4 H
59-230088 12/1984 Japan ........................... 252/301.4 H

*Primary Examiner*—Jack Cooper
*Attorney, Agent, or Firm*—Gerald J. Ferguson, Jr.

[57] ABSTRACT

A divalent europium activated alkaline earth metal halide phosphor having the formula (I):

$$M^{II}X_2 \cdot aM^{II}X'_2 \cdot bA:xEu^{2+} \qquad (I)$$

in which $M^{II}$ is at least one alkaline earth metal selected from the group consisting of Ba, Sr and Ca; each of X and X' is at least one halogen selected from the group consisting of Cl, Br and I, and X≠X'; A is at least one oxide selected from the group consisting of $SiO_2$ and $P_2O_5$; and a, b and x are numbers satisfying the conditions of $0.1 \leq a \leq 10.0$, $10^{-4} \leq b \leq 2 \times 10^{-1}$ and $0 < x \leq 0.2$, respectively. A radiation image recording and reproducing method utilizing said phosphor and a radiation image storage panel employing said phosphor are also disclosed.

13 Claims, 2 Drawing Sheets

PHOSPHOR AND RADIATION IMAGE STORAGE PANEL

This application is a continuation of Ser. No. 047,594, filed 5/11/87, now abandoned, which itself was a continuation of Ser. No. 727,972, filed April 26, 1985, now abandoned.

BACKGROUND OF THE INVENTION

1. Field of the Invention

The present invention relates to a phosphor, a radiation image recording and reproducing method utilizing the same, and a radiation image storage panel employing the same. More particularly, the invention relates to a divalent europium activated alkaline earth metal halide stimulable phosphor, a radiation image recording and reproducing method utilizing the same, and a radiation image storage panel employing the same.

2. Description of the Prior Art

There is well known a divalent europium activated alkaline earth metal fluorohalide phosphor ($M^{II}FX:Eu^{2+}$, in which $M^{II}$ is at least one alkaline earth metal selected from the group consisting of Ba, Sr and Ca; and X is a halogen other than fluorine), as a divalent europium activated alkaline earth metal halide phosphor. The phosphor gives emission (spontaneous emission) in the near ultraviolet region when exposed to a radiation such as X-rays. The phosphor also gives emission (stimulated emission) in the near ultraviolet region when excited with an electromagnetic wave such as visible light or infrared rays after exposure to radiation such as X-rays. Namely, the phosphor is a stimulable phosphor.

A radiation image recording and reproducing method utilizing a stimulable phosphor can be employed in place of the conventional radiography utilizing a combination of a radiographic film having an emulsion layer containing a photosensitive silver salt and an intensifying screen as described, for instance, in U.S. Pat. No. 4,239,968. The method involves steps of causing a stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose, as compared with the conventional radiography. Accordingly, this method is of great value, especially when the method is used for medical diagnosis.

As for a stimulable phosphor employable in the radiation image recording and reproducing method, almost no stimulable phosphor other than the above-mentioned divalent europium activated alkaline earth metal fluorohalide phosphor has been known.

The present invention discovered a novel divalent europium activated alkaline earth metal halide phosphor having the following formula:

$$M^{II}X_2 \cdot aM^{II}X'_2 : xEu^{2+}$$

in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively, and applied for a patent with respect to said phosphor, a radiation image recording and reproducing method utilizing said phosphor and a radiation image storage panel employing said phosphor (U.S. Patent Application No. 660,987 and European Patent Application No. 84112417.5).

The novel divalent europium activated alkaline earth metal halide phosphor has been confirmed to have a crystal structure different from that of the aforementioned $M^{II}FX:Eu^{2+}$ phosphor on the basis of the X-ray diffraction patterns as described in the above application. This phosphor gives spontaneous emission (peak wavelength: approx. 405 nm) in the near ultraviolet to blue region when exposed to a radiation such as X-rays, ultraviolet rays and cathode rays, and also gives stimulated emission in the near ultraviolet to blue region when excited with an electromagnetic wave having a wavelength within the region of 450–1000 nm after exposure to a radiation such as X-rays, ultraviolet rays and cathode rays. Accordingly, the phosphor is very useful as a phosphor for a radiographic intensifying screen employed in the conventional radiography, and is also useful as a phosphor for a radiation image storage panel employed in the radiation image recording and reproducing method utilizing a stimulable phosphor.

The phosphor is desired to have the luminance of spontaneous emission and the luminance of stimulated emission as high as possible. Further, the radiation image recording and reproducing method which employs a radiation image storage panel comprising said phosphor is desirable to have higher sensitivity. The radiation image storage panel to a radiation generally increases as the luminance of stimulated emission of the phosphor employed therefor increases. Also from this point, the phosphor employed for the panel is desired to show the stimulated emission of higher luminance.

SUMMARY OF THE INVENTION

An object of the present invention is to provide a phosphor improved in the luminance of spontaneous emission with respect to the above-mentioned novel divalent europium activated alkaline earth metal halide phosphor.

Another object of the present invention is to provide a phosphor improved in the luminance of stimulated emission with respect to the above-mentioned novel phosphor.

A further object of the present invention is to provide a radiation image recording and reproducing method improved in the sensitivity and a radiation image storage panel employed therein.

As the results of the study on the novel divalent europium activated alkaline earth metal halide phosphor, the present inventors found that a phosphor obtained by incorporating thereinto a specific amount of silicon dioxide and/or phosphorus pentoxide shows spontaneous emission of high luminance. Also found is that a phosphor obtained by incorporating a specific amount of silicon dioxide into said phosphor shows stimulated emission of high luminance, to accomplish the invention.

The phosphor of the invention is a divalent europium activated alkaline earth metal halide phorphor having the formula (I):

$$M^{II}X_2 \cdot aM^{II}X'_2 \cdot bA : xEu^{2+} \qquad (I)$$

in which $M^{II}$ is at least one alkaline earth metal selected from the group consisting of Ba, Sr and Ca; each of X and X' is at least one halogen selected from the group consisting of Cl, Br and I, and $X \neq X'$; A is at least one oxide selected from the group consisting of $SiO_2$ and $P_2O_5$; and a, b and x are numbers satisfying the conditions of $0.1 \leq a \leq 10.0$, $10^{-4} \leq b \geq 2 \times 10^{-1}$ and $0 < x\ 0.2$, respectively.

The phosphor of the invention having the formula (I), which contains a specific amount of silicon dioxide and/or phosphorus pentoxide shows spontaneous emission of high luminance when excited with a radiation such as X-rays.

The phosphor of the invention which contains a specific amount of silicon dioxide shows stimulated emission of high luminance when excited with an electromagnetic wave having a wavelength within the region of 450–1000 nm after exposure to a radiation such as X-rays.

On the basis of this finding, the present inventors further achieved the invention.

That is, the radiation image recording and reproducing method of the invention comprises steps of:

(i) causing a divalent europium activated alkaline earth metal halide phosphor having the formula (II):

$$M^{II}X_2 \cdot aM^{II}X'_2 \cdot bSiO_2 : xEu^{2+}$$

in which $M^{II}$ is at least one alkaline earth metal selected from the group consisting of Ba, Sr and Ca; each of X and X' is at least one halogen selected from the group consisting of Cl, Br and I, and $X \neq X'$; and a, b and x are numbers satisfying the conditions of $0.1 \leq a \leq 10.0$, $10^{-4} \leq b \leq 2 \times 10^{-1}$ and $0 < x \leq 0.2$, respectively, to absorb a radiation having passed through an object or having radiated from an object;

(ii) exposing said stimulable phosphor to an electromagnetic wave having a wavelength within the range of 450–1000 nm to release the radiation energy stored therein as light emission; and (iii) detecting the emitted light.

The radiation image storage panel of the invention comprises a support and a stimulable phosphor layer provided thereon, in which said stiumlable phosphor layer contains the divalent europium activated alkaline earth metal halide phosphor having the formula (II).

The radiation image recording and reproducing method of the invention utilizing the phosphor having the formula (II) is remarkably improved in the sensitivity, and the radiation image storage panel employing said phosphor has the highly enhanced sensitivity.

DETAILED DESCRIPTION OF THE INVENTION

The divalent europium activated alkaline earth metal halide phosphor of the present invention can be prepared for instance, by a process described below.

As starting materials, the following materials can be employed:

(1) at least two alkaline earth metal halides selected from the group consisting of $BaCl_2$, $SrCl_2$, $CaCl_2$, $BaBr_2$, $SrBr_2$, $CaBr_2$, $BaI_2$, $SrI_2$ and $CaI_2$;

(2) at least one oxide selected from the group consisting of $SiO_2$ and $P_2O_5$; and (3) at least one compound selected from the group consisting of europium compounds such as europium halide, europium oxide, europium nitrate and europium sulfate.

As the starting material (1), two or more kinds of alkaline earth metal halides having a halogen different from each other are employed. As for the starting material (2), silicon dioxide and/or phosphorus pentoxide are employed. Further, ammonium halide ($NH_4X''$, in which X'' is any one of Cl, Br and I) may be employed as a flux.

The alkaline earth metal halides (1), oxide (2) and europium compound (3) are, in the first place, mixed in the stoichiometric ratio corresponding to the formula (III):

$$M^{II}X_2 \cdot aM^{II}X'_2 \cdot bA : xEu \qquad (III)$$

in which $M^{II}$, X, X', A, a, b and x have the same meanings as defined above.

The mixture of starting materials for the phosphor of the present invention is prepared by any one of the following procedures:

(i) simply mixing the starting materials (1), (2) and (3);

(ii) mixing the starting materials (1) and (2), heating the obtained mixture at a temperature of not lower than 100° C. for several hours and then mixing the heat-treated mixture with the starting material (3); and (iii) mixing the starting materials (1) and (2) in the form of a solution, drying the solution by reduced pressure drying, vacuum dryihng or spray drying under heating (preferably, 50°–200°C.), and then mixing the obtained dry product with the starting material (3).

Further, as a modification of the procedure ii), there may be mentioned a procedure comprising mixing the starting materials (1), (2) and (3) and subjecting the obtained mixture to the heating treatment; or a procedure comprising mixing the starting materials (1) and (3), subjecting the obtained mixture to the heating treatment and mixing the starting material (2) with the heat-treated product. As other modification of the procedure (iii), there may be mentioned a procedure comprising mixing the starting materials (1), (2) and (3) in the form of a solution and subjecting the solution to the drying; or a procedure comprising mixing the starting materials (1) and (3) in the form of a solution, subjecting the solution to the drying and mixing the obtained dry product with the starting material (2).

The mixing is carried out using a conventional mixing apparatus such as a variety of mixers, a V-type blender, a ball mill and a rod mill in any case of the procedures (i), (ii) and (iii).

Then, the resulting mixture of the starting materials is placed in a heat-resistant container such as a quartz boat, an alumina crucible or a quartz crucible, and fired in an electric furnace. The temperature for the firing suitably ranges from 500° to 1300° C., and preferably ranges from 700° to 1000° C. The firing period is determined depending upon the amount of the mixture of starting materials, the firing temperature, etc., and suitably ranges from 0.5 to 6 hours. As the firing atmosphere, there can be employed a weak reducing atmosphere such as a nitrogen gas atmosphere containing a small amount of hydrogen gas or a carbon dioxide gas atmosphere containing carbon monoxide gas. A trivalent europium compound is generally employed as the above-mentioned starting material (3) and in the firing stage, the trivalent europium contained in the mixture is reduced into divalent europium by the weak reducing atmosphere.

After firing the mixture of starting materials for the phosphor as described above, the fired product is taken out of the furnace, allowed to stand for cooling and pulverized. The pulverized product may be again fired (second firing). As the firing atmosphere for the second firing, there can be employed a neutral atmosphere such as a nitrogen gas atmosphere and an argon gas atmosphere as well as the above-mentioned weak reducing atmosphere. The temperature for the second firing ranges from 500° to 800° C., and the firing period ranges from 0.5 to 12 hours.

Through the firing procedure, a phosphor of the present invention is produced. The phosphor thus obtained may be processed in a conventional manner involving a variety of procedures for the preparation of phosphors such as a washing procedure, a drying procedure and a sieving procedure.

The phosphor of the present invention prepared in accordance with the above-described process is a divalent europium activated alkaline earth metal halide phosphor having the formula (I):

$$M^{II}X_2 \cdot aM^{II}X'_2 \cdot bA : xEu^+ \quad (I)$$

in which $M^{II}$ is at least one alkaline earth metal selected from the group consisting of Ba, Sr and Ca; each of X and X' is at least one halogen selected from the group consisting of Cl, Br and I, and $X \neq X'$; A is at least one oxide selected from the group consisting of $SiO_2$ and $P_2O_5$; and a, b and x are numbers satisfying the conditions of $0.1 \leq a \leq 10.0$, $10^{-4} \leq b \leq 2 \times 10^{-1}$ and $0 < x\ 0.2$, respectively.

From the viewpoint of enhancement in the luminance of spontaneous emission, the phosphor of the invention having the formula (I) contains at least one oxide of silicon dioxide ($SiO_2$) and phosphorus pentoxide ($P_2O_5$). From the viewpoint of enhancement in the luminance of stimulated emission, the phosphor of the invention contains at least silicon dioxide.

Further, from the viewpoint of enhancement in the luminance of spontaneous emission or in the luminance of stimulated emission, the number for b indicating the amount of oxide in the case of A being $SiO_2$ is preferably within the range of $6 \times 10^{-4} \leq b \leq 10^{-1}$. In the case of A being $P_2O_5$, the number for b is preferably within the range of $2 \times 10^{-3} \leq b \leq 5 \times 10^{-2}$.

From the viewpoint of enhancement in the luminance of spontaneous emission and stimulated emission, the number for a indicating the ratio between $M^{II}X_2$ and $M^{II}X'_2$ is preferably within the range of $0.3 \leq a \leq 3.3$ and more preferably of $0.5 \leq a \leq 2.0$, and the number for x indicating the amount of europium activator is preferably within the range of $10^{-5} \leq x \leq 10^{-1}$.

The phosphor having the formula (I) may contain other various additives as far as the effect given by adding oxide thereto (enhancement in the luminance of spontaneous emission or in the luminance of stimulated emission) is not reduced. The additives can be added to the starting materials in the mixing procedure or to the obtained mixture prior to the firing procedure in the preparation for the phosphor.

The phosphor of the invention is very useful as a phosphor employed in a radiographic intensifying screen for the conventional radiography or in a radiation image storage panel for the radiation image recording and reproducing method, both screen and panel being used in medical radiography such as X-ray photography and industrial radiography for non-destructive inspection.

Particularly, the phosphor having the formula (I) in which A is $SiO_2$ shows stimulated emission of high luminance and is preferably employable for the radiation image recording and reproducing method as described above. That is the phosphor having the formula (II):

$$M^{II}X_2 \cdot aM^{II}X'_2 \cdot bSiO_2 : xEu^{2+} \quad (II)$$

in which $M^{II}$ is at least one alkaline earth metal selected from the group consisting of Ba, Sr and Ca; each of X and X' is at least one halogen selected from the group consisting of Cl, Br and I, and $X \neq X'$; and a, b and x are numbers satisfying the conditions of $0.1 \leq a \leq 10.0$, $10^{-4} \leq b \leq 2 \times 10^{-1}$ and $0 < x \leq 0.2$, respectively.

Figure 1:
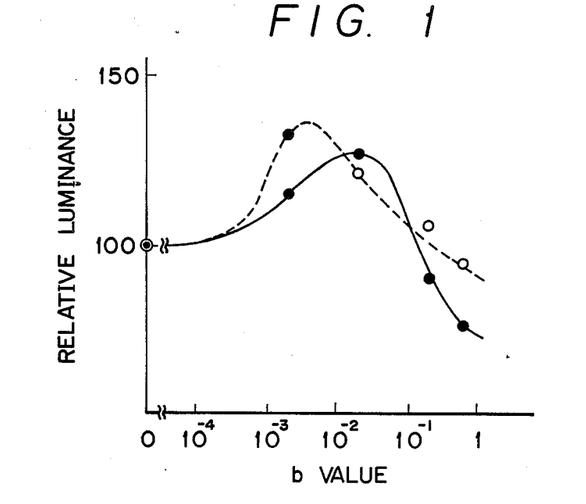
FIG. 1 shows a relationship between b value and luminance of spontaneous emission (solid curve) and a relationship between b value and luminance of stimulated emission (dotted curve) with respect to $BaCl_2 \cdot BaBr_2 \cdot bSiO_2 : 0.001Eu^{2+}$ phosphor, which is an example of the divalent europium activated alkaline earth metal halide phosphor of the invention.

An example of the phosphor having the formula (II), $BaCl_2 \cdot BaBr_2 \cdot bSiO_2 : 0.001Eu^{2+}$ phosphor, has a relationship between b value (the amount of silicon dioxide) and the luminance of stimulated emission as shown in FIG. 1.

In FIG. 1, dotted curve indicates a relationship between b value and luminance of stimulated emission [emission luminance upon excitation with a semiconductor laser beam (wavelength: 780 nm) after exposure to X-rays at 80 KVp]with respect to $BaCl_2 \cdot BaBr_2 \cdot bSiO_2 : 0.001Eu^{2+}$ phosphor. As is evident from FIG. 1, the $BaCl_2 \cdot BaBr_2 \cdot bSiO_2 : 0.001Eu^{2+}$ phosphor having b value within a range of $10^{-4} \leq b \leq 2 \times 10^{-1}$ gives stimulated emission of higher luminance than the phosphor containing no silicon dioxide (b=0). On the basis of this fact, the b value range of the divalent europium activated alkaline earth metal halide phosphor of the invention, namely $10^{-4} \leq b \leq 2 \times 10^{-1}$, has been decided. As is also evident from FIG. 1, the phosphor having b value within a range of $6 \times 10^{-4} \leq b \leq 10^{-1}$ gives stimulated emission of prominently high luminance.

It has been confirmed that phosphors according to the invention having the formula (II) in which $M^{II}$, X, X', a and x are other than the above-stated ones have the same tendencies in the relationships between b value and the luminance of stimulated emission as shown in the dotted curve of FIG. 1.

The above-described divalent europium activated alkaline earth metal halide phosphor having the formula (II) shows a stimulation spectrum similar to that of the divalent europium activated alkaline earth metal halide phosphor as illustrated in the aforementioned U.S. patent application Ser. No. 660,987. Since the wavelength region of the stimulation spectrum is wide and 450–1000 nm, it is possible to vary the wavelength of stimulating rays for exciting the phosphor in the radiation image recording and reproducing method of the invention. It means that a source of stimulating rays can be suitably selected according to the purpose. For example, a semiconductor laser (having a wavelength in the infrared region) which is in a small size and needs only weak driving power can be employed as the source of stimulating rays, and accordingly the system for carrying out the method can be made compact. From the viewpoint of the luminance of stimulated emission and of the separation on wavelength between the emitted light and stimulating rays, the stimulating rays are preferred to be an electromagnetic wave having a wavelength within the range of 500–850 nm.

The divalent europium activated alkaline earth metal halide phosphor having the formula (II) is preferably employed in the form of a radiation image storage panel (also referred to as a stimulable phosphor sheet) in the radiation image recording and reproducing method of the invention.

The radiation image storage panel comprises a support and at least one phosphor layer provided on one surface of the support. The phosphor layer comprises a binder and a stimulable phosphor dispersed therein. Further, a transparent protective film is generally provided on the free surface of the phosphor layer (surface not facing the support) to keep the phosphor layer from chemical deterioration or physical shock.

In other words, the radiation image recording and reproducing method is preferably carried out using the radiation image storage panel comprising a phosphor layer containing the divalent europium activated alkaline earth metal halide phosphor having the above formula (II).

In the method utilizing the stimulable phosphor having the formula (II) in the form of the panel, a radiation having passed through an object or radiated from an object is absorbed by the phosphor layer of the panel to form a radiation image as a radiation energy-stored image on the panel. The panel is then excited (e.g., scanned) with an electromagnetic wave in the wavelength region of 450–1000 nm to release the stored image as stimulated emission. The emitted light is photoelectrically detected to obtain electric signals so that the radiation image of the object can be reproduced as a visible image from the electric signals.

The radiation image recording and reproducing method of the present invention will be described in more detail with respect to an example of a radiation image storage panel containing the stimulable phosphor having the formula (II), by referring to a schematic view shown in FIG. 3.

Figure 3:
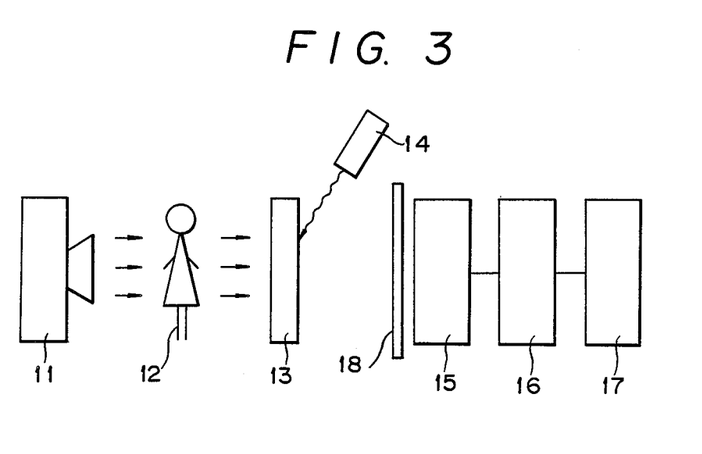
FIG. 3 is a schematic view showing the radiation image recording and reproducing method according to the invention.

In FIG. 3 which shows the total system of the radiation image recording and reproducing method of the invention, a radiation generating device 11 such as an X-ray source provides a radiation for irradiating an object 12 therewith; a radiation image storage panel 13 containing the stimulable phosphor having the formula (II) absorbs and stores the radiation having passed through the object 12; a source of stimulating rays 14 provides an electromagnetic wave for releasing the radiation energy stored in the panel 13 as light emission; a photosensor 15 such as a photomultiplier faces the panel 13 for detecting the light emitted by the panel 13 and converting it to electric signals; an image reproducing device 16 is connected with the photosensor 15 to reproduce a radiation image from the electric signals detected by the photosensor 15; a display device 17 is connected with the reproducing device 16 to display the reproduced image in the form of a visible image on a CRT or the like; and a filter 18 is disposed in front of the photosensor 15 to cut off the stimulating rays reflected by the panel 13 and allow only the light emitted by the panel 13 to pass through.

FIG. 3 illustrates an example of the system according to the method of the invention employed for obtaining a radiation-transmission image of an object. However, in the case that the object 12 itself emits a radiation, it is unnecessary to install the above-mentioned radiation generating device 11. Further, the photosensor 15 to the display device 17 in the system can be replaced with other appropriate devices which can reproduce a radiation image having the information of the object 12 from the light emitted by the panel 13.

Figure 2:
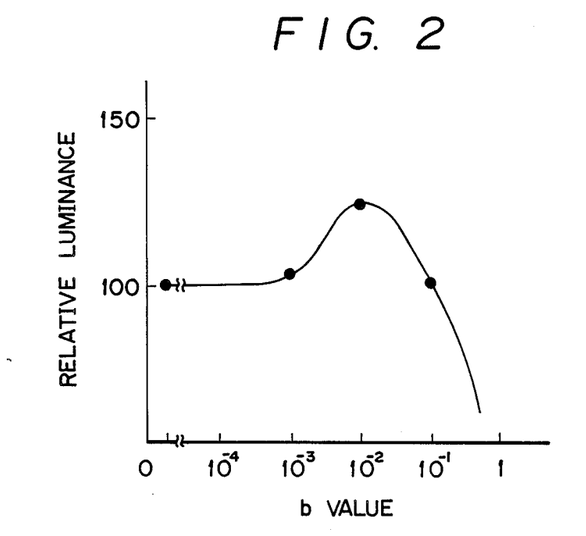
FIG. 2 shows a relationship between b value and luminance of spontaneous emission with respect to $BaCl_2 \cdot BaBr_2 \cdot bP_2O_5 : 0.001Eu^{2+}$ phosphor, which is an example of the divalent europium activated alkaline earth metal halide phosphor of the invention.

Referring to FIG. 2, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus, a radiation energy-stored image (a kind of latent image) corresponding to the radiation-transmission image of the object 12 is formed on the panel 13.

Thereafter, when the radiation image storage panel 13 is irradiated with an electromagnetic wave having the wavelength within the range of 450–1000 nm, which is provided by the source of stimulating rays 14, the radiation energy-stored image formed on the panel 13 is released as light emission. The intensity of so released light is in proportion to the intensity of the radiation energy which has been absorbed by the phosphor layer of the panel 13. The light signals corresponding to the intensity of the emitted light are converted to electric signals by means of the photosensor 15, the electric signals are reproduced as an image in the image reproducing device 16, and the reproduced image is displayed on the display device 17.

The detection of the radiation image stored in the panel 13 can be, for example, carried out by scanning the panel with the electromagnetic wave such as a laser beam provided by the source of stimulating rays 14 and detecting the light emitted from the panel 13 under scanning by means of the photosensor 15 such as photomultiplier to sequentially obtain electric signals.

In the radiation image recording and reproducing method of the present invention, there is no specific limitation on the radiation employable for exposure of an object to obtain a radiation-transmittance image thereof, as far as the above-described phosphor gives stimulated emission upon excitation with the electromagnetic wave after exposure to the radiation. Examples of the radiation employable in the invention include those generally known, such as X-rays, cathode rays and ultraviolet rays. Likewise, there is no specific limitation on the radiation radiating from an object for obtaining a radiation image thereof, as far as the radiation can be absorbed by the above-described phosphor to serve as an energy source for producing the stimulated emission. Examples of the radiation include γ-rays, α-rays and β-rays.

As the source of stimulating rays for exciting the phosphor which has absorbed the radiation having passed through or radiated from the object, there can be employed, for instance, light sources providing light having a band spectrum distribution in the wavelength region of 450–1000 nm; and light sources providing light having a single wavelength or more in said region such as an Ar ion laser, a Kr ion laser, a He-Ne laser, a ruby laser, a semiconductor laser, a glass laser, a YAG laser, a dye laser and a light emitting diode (LED). Among the above-mentioned sources of stimulating rays, the lasers are preferred because the radiation image storage panel is exposed thereto with a high energy density per unit area. Particularly preferred are a He-Ne laser, Ar ion laser and Kr ion laser from the viewpoints of stability, output power, etc. The semiconductor laser is also preferred, because its size is small, it can be driven by a weak electric power and its output power can be easily stablized because of the direct modulation thereof.

The radiation image storage panel employable in the radiation image recording and reproducing method of the invention will be described.

The radiation image storage panel, as described hereinbefore, comprises a support and a phosphor layer provided thereof which comprises a binder and the above-described divalent europium activated alkaline earth metal halide phosphor having the formula (II) dispersed therein.

The radiation image storage panel having such structure can be prepared, for instance, in the manner described below.

Examples of the binder to be employed in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate.

The phosphor layer can be formed on a support, for instance, by the following procedure.

In the first place, the stimulable phosphor particles and a binder are added to an appropriate solvent, and then they are thoroughly mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder : phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

A support material employed in the present invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provided thereby. For instance, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided, and the constitution thereof can be optionally selected depending upon the purpose of the radiation image storage panel.

As described in U.S. patent application Ser. No. 496,278 (the whole content of which is described in European Patent Publication No. 92241), the phosphor layer-side surface of the support (or the surface of an adhesive layer, light-reflecting layer, or light-absorbing layer in the case that such layers are provided on the phosphor layer) may be provided with protruded and depressed portions for enhancement of the sharpness of radiation image.

After applying the coating dispersion to the support as described above, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu$m to 1 mm, preferably from 50 to 500 $\mu$m.

The phosphor layer can be provided on the support by the methods other than that given in the above. For instance, the phosphor layer is initally prepared on a sheet (false support) such as a glass plate, metal plate or plastic sheet using the aforementioned coating dispersion and then thus prepared phosphor layer is overlaid on the genuine support by pressing or using an adhesive agent.

The phosphor layer placed on the support can be in the form of a single layer or in the form of plural (two or more) layers. When the plural phosphor layers are placed, at least one layer contains the aforementioned divalent europium activated alkaline earth metal halide phosphor having the formula (II), and the plural layers may be placed in such a manner that a layer nearer to the surface shows stimulated emission of higher intensity. In any case, that is, in either the single phosphor layer or plural phosphor layers, a variety of known stimulable phosphors are employable in combination with the above-mentioned stimulable phosphor.

Examples of the stimulable phosphor employable in combination with the stimulable phosphor of the invention include the aforementioned phosphor and the phosphors described below;

ZnS:Cu,Pb, BaOlxA.$_2$O$_3$:Eu, in which x is a number satisfying the condition of $0.8 \leq x \leq 10$, and M$^{II}$O.xSiO$_2$:A, in which M$^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

(Ba$_{1-x-y}$ Mg$_x$, Ca$_y$)FX:aEu$^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$, as described in Japanese Patent Provisional Publication No. 55(1980)-12143; and LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078.

A radiation image storage panel generally has a transparent film on a free surface of a phosphor layer to physically and chemically protect the phosphor layer. In the panel of the present invention, it is preferable to provide a transparent film for the same purpose.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 $\mu$m.

The present invention will be illustrated by the following examples, but these examples by no means restrict the invention.

EXAMPLE 1

To 800 ml of distilled water (H$_2$O) were added 333.2 g. of barium bromide (BaBr$_2$.2H$_2$O), 244.3 g. of barium chloride (BaCl$_2$.2H$_2$O) and 0.783 g. of europium bromide (EuBr$_3$), and they were mixed to obtain an aqueous solution. The aqueous solution was dried at 60° C. under reduced pressure for 3 hours and further dried at 150° C. under vacuum for another 3 hours to obtain a mixture of the starting materials for the preparation of a phosphor.

After 1.20 g. of silicon dioxide (SiO$_2$) was added to the mixture of the starting materials to mix therewith, the obtained mixture was placed in an alumina crucible, which was, in turn, placed in a high-temperature electric furnace. The mixture was then fired at 900° C. for 1.5 hours in a carbon dioxide atmosphere containing carbon monoxide. After the firing was complete, the crucible was taken out of the furnace and allowed to stand for cooling. Thus, a powdery divalent europium activated barium chlorobromide phosphor containing silicon dioxide (BaCl$_2$.BaBr$_2$.0.02SiO$_2$:0.001Eu$^{2+}$) was obtained.

Further, the amount of silicon dioxide was varied within a range of 0–1.0 mol per 1 mol of BaCl$_2$.BaBr$_2$, to obtain a variety of powdery divalent europium activated barium chlorobromide phosphors containing a different amount of silicon dioxide (BaCl$_2$.BaBr$_2$.bSiO$_2$: 0.001Eu$^{2+}$).

The phosphors prepared in Example 1 were excited with X-rays at 80 KVp to measure the luminance of spontaneous emission, and also excited with a semiconductor laser beam (wavelength: 780 nm) after exposure to X-rays at 80 KVp, to measure the luminance of stimulated emission. The results are shown in FIG. 1.

FIG. 1 graphically shows a relationship between an amount of silicon dioxide (b value) and luminance of spontaneous emission (solid curve) and a relationship between b value and luminance of stimulated emission (dotted curve) with respect to BaCl$_2$.BaBr$_2$.bSiO$_2$: 0.001Eu$^{2+}$.

As is evident from FIG. 1, the BaCl$_2$.BaBr$_2$.bSiO$_2$: 0.001Eu$^{2+}$ phosphor of the invention having b value within a range of $10^{-4} \leq b \leq 2 \times 10^{-1}$ was enhanced in the luminance of spontaneous emission and in the luminance of stimulated emission, and particularly the phosphor having b value within a range of $6 \times 10^{-4} \leq b \leq 10^{-1}$ showed spontaneous emission and stimulated emision of high luminance.

EXAMPLE 2

The procedure of Example 1 was repeated except for using 2.84 g. of phosphorus pentoxide ($P_2O_5$) instead of silicon dioxide to obtain a powdery divalent europium activated barium chlorobromide phosphor containing phosphorus pentoxide ($BaCl_2 \cdot BaBr_2 \cdot 0.02P_2O_5:0.001Eu^{2+}$).

Further, the amount of phosphorus pentoxide was varied within a range of 0–1.0 mol per 1 mol of $BaCl_2 \cdot BaBr_2$, to obtain a variety of powdery divalent europium activated barium chlorobromide phosphors containing a different amount of phosphorus pentoxide ($BaCl_2 \cdot BaBr_2 \cdot bP_2O_5:0.001Eu^{2+}$).

The phosphors prepared in Example 2 were excited with X-rays at 80 KVp to evaluate the luminance of spontaneous emission.

FIG. 2 graphically shows a relationship between an amount of phosphorus pentoxide (b value) and luminance of spontaneous emission with respect to $BaCl_2 \cdot BaBr_2 \cdot bP_2O_5: 0.001Eu^{2+}$.

As is evident from FIG. 2, the $BaCl_2BaBr_2 \cdot bP_2O_5:0.001Eu^{2+}$ phosphor of the invention having b value within a range of $10^{-4} \leq b \leq 10^{-1}$ was enhanced in the luminance of spontaneous emission, and particularly the phosphor having b value within a range of $2 \times 10^{-3} \leq b \leq 5 \times 10^{-2}$ showed spontaneous emission of high luminance.

EXAMPLE 3

To a mixture of the powdery divalent europium activated barium chlorobromide phosphor containing silicon dioxide ($BaCl_2 \cdot BaBr_2 \cdot 0.02SiO_2:0.001Eu^{2+}$) which was obtained in Example 1 and a linear polyester resin were added successively methyl ethyl ketone and nitrocellulose (nitrification degree: 11.5 %), to prepare a dispersion containing the phosphor and the binder (10:1, by weight). Subsequently, tricresyl phosphate, n-butanol and methyl ethyl ketone were added to the dispersion. The mixture was sufficiently stirred by means of a propeller agitater to obtain a homogeneous coating dispersion having a viscosity of 25–35 PS (at 25° C.).

The coating dispersion was applied to a polyethylene terephthalate sheet containing titanium dioxide (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having a thickness of 250 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a support, a phosphor layer and a transparent protective film was prepared.

COMPARISON EXAMPLE 1

The procedure of Example 1 was repeated except for adding no silicon dioxide to obtain a powdery divalent europium activated barium chlorobromide phosphor ($BaCl_2 \cdot BaBr_2:0.001 Eu^{2+}$).

The procedure of Example 3 was repeated except for employing the obtained phosphor instead of the $BaCl_2 \cdot BaBr_2 \cdot 0.02SiO_2:0.001Eu^{2+}$ phosphor, to prepare a radiation image storage panel consisting essentially of a support, a phosphor layer and a transparent protective film.

The radiation image storage panels prepared in Examples 3 and Comparison Example 1 were measured on the sensitivity (i.e., luminance of stimulated emission) when excited with a semiconductor laser beam (wavelength: 780 nm) after exposure to X-rays at 80 KVp.

The results on the evaluation of the panels are set forth in Table 1.

TABLE 1

|  | Relative Sensitivity |
| --- | --- |
| Example 3 | 130 |
| Com. Example 1 | 100 |

We claim:

1. A radiation image storage panel comprising a support and a stimulable phosphor layer provided thereon, in which said stimulable phosphor layer contains a divalent europium activated alkaline earth metal halide phosphor having the formula (II):

$$M^{II}X_2 \cdot aM^{II}X'_2 \cdot bSiO_2:xEu^+ \quad (II)$$

in which $M^{II}$ is at least one alkaline earth metal selected from the group consisting of Ba, Sr and Ca; each of X and X' is at least one halogen selected from the group consisting of Cl, Br and I, and $X \neq X'$; and a, b and x are numbers satisfying the conditions of $0.1 \leq z \leq 10.0$, $10^{-4} \leq b \leq 2 \times 10^{-1}$ and $0 < x \leq 0.2$, respectively.

2. The radiation image storage panel as claimed in claim 1, in which b in the formula (II) is a number satisfying the condition of $6 \times 10^{-4} \leq b \leq 10^{-1}$.

3. The radiation image storage panel as claimed in claim 1, in which a in the formula (II) is a number satisfying the condition of $0.3 \leq a \leq 3.3$.

4. The radiation image storage panel as claimed in claim 1, in which $M^{II}$ in the formula (II) is Ba.

5. The radiation image storage panel as claimed in claim 1, in which each of X and X' in the formula (II) is Cl or Br.

6. The radiation image storage panel as claimed in claim 1, in which x in the formula (II) is a number satisfying the condition of $10^{-5} \leq x \leq 10^{-1}$.

7. A divalent europium activated alkaline earth metal halide phosphor having the formula (I):

$$M^{II}X_2 \cdot aM^{II}X'_2 \cdot bP_2O_5:xEu^{2+}$$

in which $M^{II}$ is at least one alkaline earth metal selected from the group consisting of Ba, Sr and Ca; each of X and X' is at least one halogen selected from the group consisting of Cl, Br and I, and $X \neq X'$; and a, b and x are numbers satisfying the conditions of $0.1 \leq a \leq 10.0$, $2 \times 10^{-3} \leq b \leq 5 \times 10^{-2}$ and $0 < x \leq 0.2$ respectively.

8. A divalent europium activated alkaline earth metal halide phosphor having the formula (II):

$$M^{II}X_2 \cdot aM^{II}X'_2 \cdot bSiO_2:xEu^{2+}$$

in which $M^{II}$ is at least one alkaline earth metal selected from the group consisting of Ba, Sr and Ca; each of X and X' is at least one halogen selected from the group consisting of Cl, Br and I, and $X \neq X'$; and a, b and x are numbers satisfying the conditions of $0.1 \leq a \leq 10.0$, $10^{-4} \leq b \leq 2 \times 10^{-1}$ and $0 < x \leq 0.2$, respectively.

9. The phosphor as claimed in claim 8, in which b is a number satisfying the condition of $6\times 10^{-4} \leq b \leq 10^{-1}$.

10. The phosphor as claimed in claim 8, in which a in the formula (II) is a number satisfying the condition of $0.3 \leq a \leq 3.3$.

11. The phosphor as claimed in claim 8, in which $M^{II}$ in the formula (II) is Ba.

12. The phosphor as claimed in claim 8, in which each of X and X' in the formula (II) is Cl or Br.

13. The phosphor as claimed in claim 8, in which x in the formula (II) is a number satisfying the condition of $10^{-5} \leq x \leq 10^{-1}$.

* * * * *